Patented Apr. 18, 1933

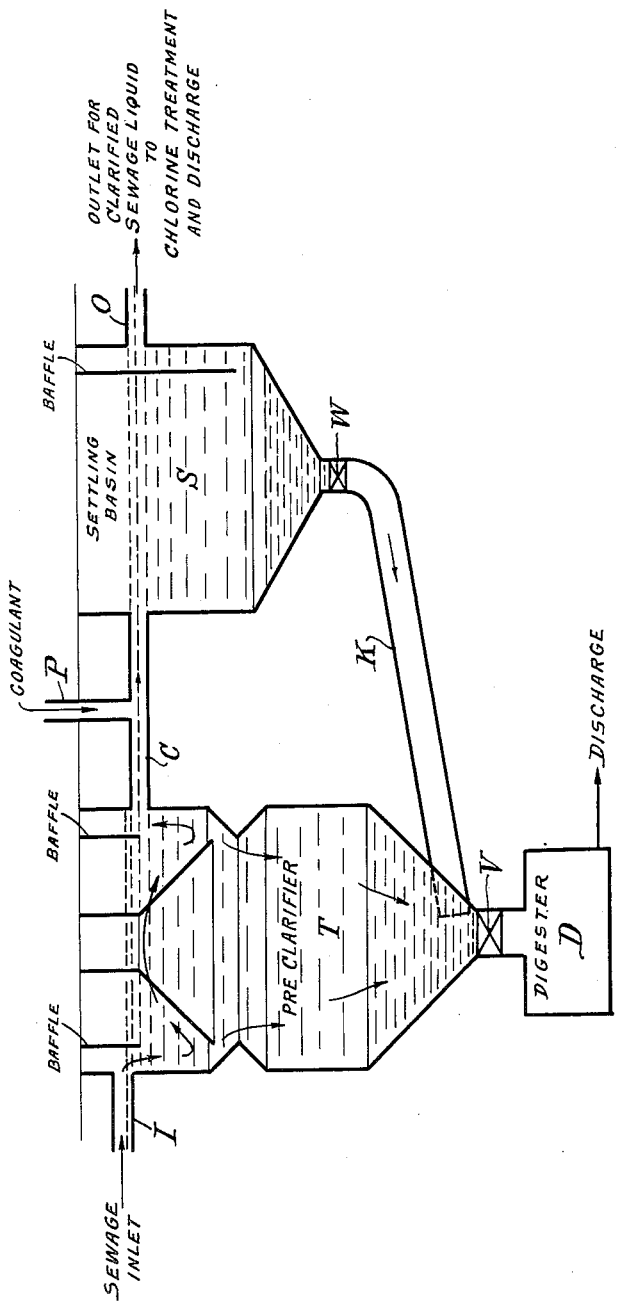

1,904,246

UNITED STATES PATENT OFFICE

GEORG ORNSTEIN, OF BERLIN, GERMANY

ART OF TREATING SEWAGE    REISSUED

Application filed December 6, 1929, Serial No. 412,093, and in Germany September 10, 1928.

I have filed an application in Germany, Sept. 10, 1928.

The present invention relates to the treatment of sewage and contemplates an improved process of sewage purification and apparatus for carrying the said process into practice.

It has been heretofore attempted to purify sewage by the direct addition to the raw sewage of coagulants, such as lime, alum, copperas and the like and after such chemical treatment, allowing the sewage to stand in settling basins in order to permit settling of precipitated sludge. While processes of this type were capable of yielding a fairly clear effluent, disadvantages and difficulties were encountered due to the colloidal and slimy nature of the precipitated sludge. In order to handle and to dewater this sludge, it had to be spread out on sludge beds where, as soon as putrescence set in, the spread sludge became the cause of considerable trouble.

The object of the present invention is to provide a process and suitable apparatus therefor whereby sewage may be efficiently and economically purified to yield a very clear effluent and to produce a substantially dewatered and conveniently handleable sludge.

Although in my new process I employ as a part thereof chemical coagulants such as have heretofore been proposed, I do so in such a manner as to realize the advantages of the chemical effect more efficiently, while at the same time avoiding and overcoming the difficulties and disadvantages which were attendant upon the older processes.

My new process furthermore effects a substantial economy in the consumption of chemical coagulating agents.

Other objects and advantages will become apparent from the following description taken into conjunction with the accompanying drawing which illustrates diagrammatically apparatus appropriate for carrying the method into practice.

As shown in the drawing, raw sewage is passed from an inlet I to a settling tank T, preferably an Imhoff tank, wherein pre-clarifying operation is effected by permitting sludge to settle by gravity. The sludge collects on the sloped bottom of the tank and is drawn off through valve V into a digesting vessel D. In this vessel the sludge is exposed to digestion by micro-organisms according to principles well known in the art of sewage treatment. In this type of digestion, in order that a sludge be properly digested, it must, as is the case when the sludge from the pre-clarifier T is introduced into the digester D, have a liquid consistency so that it may be turned over and over by the gas generated in the course of digestion, affording a uniform mineralization of the entire mass.

The pre-clarified sewage is withdrawn from tank T via channel C to a second settling basin S. To the pre-clarified sewage is added a suitable coagulant, preferably in aqueous solution, for chemically precipitating a sludge, as, for example, through pipe P leading to channel C or some other appropriate point. Any suitable coagulant such as sulfuric acid, aluminum sulfate, copperas, chlorine, chlorine compounds, and the like, may be employed.

After the sewage has been thus mixed with the chemical coagulant, it is thereupon allowed to stand in the settling basin S where the chemically pricipitated sludge settles to the bottom, while the clear effluent flows away through the outlet O.

The sludge collected in basin S is withdrawn and combined with the sludge in digester D in any suitable manner. A conduit K controlled by valve W may be used for flowing the sludge from the bottom of basin S to digester D. In place of carrying the chemically precipitated sludge directly to the digester, it may be conducted to the inlet I of the pre-clarifying tank T.

In either case it is apparent that the pre-clarified sewage will thus, at least partially, have the benefit of a chemical treatment from the liquid accompanying the chemically pre-clarified sludge. It is also apparent that the several sludges are not separately de-watered but prior to de-watering are exposed, together, as mixed sludges, to a micro-organism digestion stage in a condition of liquid consistency at least as fluid as that at which they leave their respective tanks, whereby the mixed sludges are given the opportunity previously referred to of being turned over and over by the gas generated in the course of digestion, affording a uniform mineralization of the entire mass of the thoroughly intermixed and commingled mass.

By combining the two sludges in the aforesaid manner, the chemically treated sludge is also digested by micro-organisms this being effected in admixture with the pre-clarified sludge and is, together with the pre-clarified sludge, changed into a form which is easily de-watered.

The clarified sewage or effluent which leaves settling basin S via outlet O may be conducted to a receiving stream or body of water, but it is preferably first subjected to the action of chlorine or chlorine compounds so as to destroy bacteria and other organisms. As will be seen by reference to the drawing, the entire process can be conducted as a continuous process from the standpoint of a continuous flow of sewage through the inlet I without the necessity of manipulating any valves in the line I during the progress of any part of the process from beginning to end.

It will be observed that the new process hereinabove described contemplates postponing treatment with coagulating chemicals until after a pre-clarifying operation of a physical nature such as is involved in a gravity settling tank and a digestion of the sludge separated in the physical step with micro-organisms or the like and the addition to said sludge on the process of its digestion via a direct or indirect path of the sludge which is precipitated in the chemical stage of the treatment of the sewage which remains after the physical step has functioned.

The invention as thus described contemplates (a) the pre-clarification of sewage in any manner such as by settling, (b) the separation of the sludge deposited in the said pre-clarification, (c) the digestion of said separated sludge with any appropriate agency such as micro-organism, (d) the withdrawal from the pre-clarification stage of the pre-clarified sewage, (e) the introduction to said pre-clarified sewage of chemical coagulants, (f) the separation of the clear effluent and its delivery, preferably via a system which includes treatment with chlorine, to a receiving stream or other appropriate place of discharge, and (g) the separation of the sludge deposited as a result of the chemical treatment and its addition subsequently to the sludge undergoing digestion.

I claim:

1. The improvement in the art of purification of sewage by coagulants which comprises pre-clarifying the sewage by settling sludge therefrom prior to treatment with a coagulant, combining the aforesaid sludge with chemically precipitated sludge obtained from coagulation treatment and exposing said combined sludges to a common digestion treatment effective upon the intermixed sludges in a state of liquid consistency during the course of the said digestion treatment.

2. Apparatus for use in the treatment of sewage which comprises a pre-clarifying tank having an inlet for raw sewage, an outlet for pre-clarified sewage and an outlet for settling sludge, a digester connected to said sludge outlet for the digestion of sludge, a settling tank connected to the said outlet for pre-clarified sewage, means for introducing a chemical coagulant into said pre-clarified sewage, an outlet connected with said settling tank for leading off the clear sewage effluent, a bottom provided on said settling tank for accumulating sludge, and means associated with said bottom for conducting sludge precipitated in the settling tank to the sludge of the pre-clarifying tank.

3. Apparatus for use in the treatment of sewage which comprises a pre-clarifying tank having an inlet for raw sewage, an outlet for pre-clarified sewage and an outlet for settling sludge, a digester connected to said sludge outlet for the digestion of sludge, a settling tank connected to the said outlet for pre-clarified sewage, means for introducing a chemical coagulant into said pre-clarified sewage, an outlet connected with said settling tank for leading off the clear sewage effluent, a bottom provided on said settling tank for accumulating sludge, and a conduit leading from said tank bottom to the aforesaid digester for conducting sludge precipitated in the settling tank to the digester.

4. A continuous process of treating sewage which comprises establishing a continuous flow of raw sewage, subjecting said sewage to pre-clarification to obtain a sludge and pre-clarified sewage, withdrawing the thus pre-clarified sewage and treating it after said withdrawal with coagulants to cause precipitation of sludge from the thus treated pre-clarified sewage, drawing off the effluent, introducing the chemically precipitated sludge as well as the sludge of the pre-clarification step into a common receiver and therein exposing them as intermixed sludges to a common digestion treatment effective upon the intermixed sludges in a state of liquid consistency during the course of the said digestion treatment.

In testimony whereof, I have hereunto set my hand.

GEORG ORNSTEIN.